(12) United States Patent
Kim

(10) Patent No.: US 7,611,249 B2
(45) Date of Patent: Nov. 3, 2009

(54) PROJECTOR

(75) Inventor: Nam Sik Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 11/312,361

(22) Filed: Dec. 21, 2005

(65) Prior Publication Data
US 2006/0132724 A1 Jun. 22, 2006

(30) Foreign Application Priority Data
Dec. 22, 2004 (KR) ............... 10-2004-0110194

(51) Int. Cl.
*G03B 21/14* (2006.01)
*G02B 26/08* (2006.01)
(52) U.S. Cl. ............... 353/101; 359/210; 359/211
(58) Field of Classification Search ............ 353/101, 353/37, 81, 98; 359/749, 223, 211, 209, 359/210; 349/6
See application file for complete search history.

(56) References Cited

U.S. PATENT DOCUMENTS

| | | | | |
|---|---|---|---|---|
| 6,113,240 A | * | 9/2000 | Iizuka | .................. 353/31 |
| 6,144,503 A | * | 11/2000 | Sugano | .................. 359/749 |
| 6,592,228 B1 | * | 7/2003 | Kawashima et al. | ........ 353/101 |
| 2006/0132727 A1 | * | 6/2006 | Kim et al. | ............. 353/102 |

FOREIGN PATENT DOCUMENTS

| | | |
|---|---|---|
| CN | 2678281 Y | 2/2005 |
| EP | 1 675 393 | 6/2006 |
| JP | 05-027324 | 2/1993 |
| KR | 20-1999-0000264 | * 10/2001 |
| WO | WO-96/27142 | 9/1996 |

OTHER PUBLICATIONS

Korean Applicaiton # 20-1999-0000264, Inventor: Jeong-Ho Noh.*

* cited by examiner

*Primary Examiner*—Diane I Lee
*Assistant Examiner*—Danell L Owens
(74) *Attorney, Agent, or Firm*—Birch, Stewart, Kolasch & Birch, LLP

(57) ABSTRACT

A projector including a shiftable projection lens unit is disclosed. The projector includes an illumination unit adapted to emit generated light, a micro device adapted to receive the light from the illumination unit, and to produce an image using the received light, a projection lens unit adapted to emit the image produced by the micro device, a reflector arranged at a downstream end of the projection lens unit, and adapted to change a direction of the light incident from the projection lens unit on the reflector such that the image is externally emitted, and a driving unit adapted to shift the projection lens unit and the reflector, thereby adjusting an emission direction of the externally-emitted image.

23 Claims, 10 Drawing Sheets

PROJECTOR

This application claims the benefit of Korean Patent Application No. 10-2004-0110194, filed on Dec. 22, 2004, which is hereby incorporated by reference as if fully set forth herein.

BACKGROUND OF THE INVENTION

1. Field of the Invention

The present invention relates to a projector, and more particularly, to a projector including a shiftable projection lens unit.

2. Discussion of the Related Art

The recent tendency of display devices is to provide a large screen size as well as lightness and thinness.

Of such display devices, projectors have been greatly highlighted because they can realize a large screen of 100 inches or more.

Such a projector is a display device which projects an image produced by a micro device such as a liquid crystal display (LCD) panel, a liquid crystal on silicon (LCOS) panel, or a digital micromirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a two-panel type projector, white light is separated into color light components in a space-division and time-division manner, and the color light components are illuminated to two micro devices. In a three-panel type projector, white light is separated into color light components in a space-division manner, and the color light components are illuminated to three micro devices.

FIG. 1 is a schematic view illustrating an arrangement of a general single panel type projector. FIG. 2 is a perspective view illustrating an appearance of the projector shown in FIG. 1.

As shown in FIG. 1, the single panel type projector includes a light source 2, a color wheel 3, a light tunnel 4, illumination lenses 5 and 6, a micro device 7, a prism 8, and a projection lens unit 1.

In the illustrated single panel type projector, light emitted from the light source 2 is separated into red, green, and blue light beams. The separated light beams are modulated to have uniform brightness while passing through the light tunnel 4. The light beams are then incident on the micro device 7 after passing through the illumination lenses 5 and 6 and the prism 8.

The incident light carries an image signal while passing through the micro device 7, and is then projected onto a screen via the prism 8 and projection lens unit 1.

In the conventional projector having the above-mentioned arrangement, the projection lens unit 1 and micro device 7, which serve to externally emit light in an enlarged state, are arranged in parallel, whereas the lenses 4, 5, and 6 and color drum 3, which transfer light from the light source 2, are arranged perpendicularly to the projection lens unit 1.

As shown in FIG. 2, the projection lens unit 1 includes a plurality of lenses which are,-arranged in parallel such that the direction of light emitted from the projection lens unit 1 is identical to the direction of light incident on the projection lens unit 1.

Due to such an arrangement of the projection lens unit 1, the optical elements in the optical system of the conventional projector are arranged in a U shape. As a result, the conventional projector has an increased thickness.

As a result, the conventional projector has a problem in that there is a limitation to the installation space of the projector because an increased space must be provided in rear of the front side of the projector where the projection lens unit is arranged.

SUMMARY OF THE INVENTION

Accordingly, the present invention is directed to a projector that substantially obviates one or more problems due to limitations and disadvantages of the related art.

An object of the present invention is to provide a projector which includes an optical system having an arrangement capable of minimizing the space of the optical system, thereby reducing the thickness of the projector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projector comprises: an illumination unit adapted to emit generated light; a micro device adapted to receive the light from the illumination unit, and to produce an image using the received light; a projection lens unit adapted to emit the image produced by the micro device; a reflector arranged at a downstream end of the projection lens unit, and adapted to change a direction of the light incident from the projection lens unit on the reflector such that the image is externally emitted; and a driving unit adapted to shift the projection lens unit and the reflector, thereby adjusting an emission direction of the externally-emitted image.

The projection lens unit may include a master lens set adapted to emit light carrying the produced image, a compensation lens set adapted to compensate light emitted from the master lens set, a zoom lens set adapted to adjust a focal length of light emitted from the compensation lens set, and a focus adjusting lens set adapted to adjust a focus of light emitted from the zoom lens set.

The master lens set, the compensation lens set, the zoom lens set, and the focus adjusting lens set may be arranged in an aligned manner in parallel to a central axis of light incident on the projection lens unit.

The projection lens unit and the reflector may be integrated such that the projection lens unit and the reflector are simultaneously shiftable by the driving unit. Alternatively, the projection lens unit and the reflector may be separate from each other such that the projection lens unit and the reflector are independently shiftable by the driving unit.

In another aspect of the present invention, a projector comprises: an illumination unit adapted to emit generated light; a micro device adapted to receive the light from the illumination unit, and to produce an image using the received light; a projection lens unit adapted to emit the image produced by the micro device; a reflector arranged at a downstream end of the projection lens unit, and integrated with the projection lens unit, the reflector being adapted to change a direction of the light incident from the projection lens unit on the reflector such that the image is externally emitted; and a driving unit adapted to simultaneously shift the projection lens unit and the reflector, thereby adjusting an emission direction of the externally-emitted image.

In still another aspect of the present invention, a projector comprises: an illumination unit adapted to emit generated light; a micro device adapted to receive the light from the illumination unit, and to produce an image using the received light; a projection lens unit adapted to emit the image produced by the micro device; a reflector arranged at a downstream end of the projection lens unit, and adapted to change a direction of the light incident from the projection lens unit on the reflector such that the image is externally emitted; a first driving unit adapted to shift the projection lens unit in a predetermined direction; a second driving unit adapted to shift the reflector in a predetermined direction; and a controller adapted to control the first and second driving units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The concept of the present invention is to reduce the installation space of a projector by configuring an optical system of the projector such that the thickness of the projector is reduced.

Figure 1:
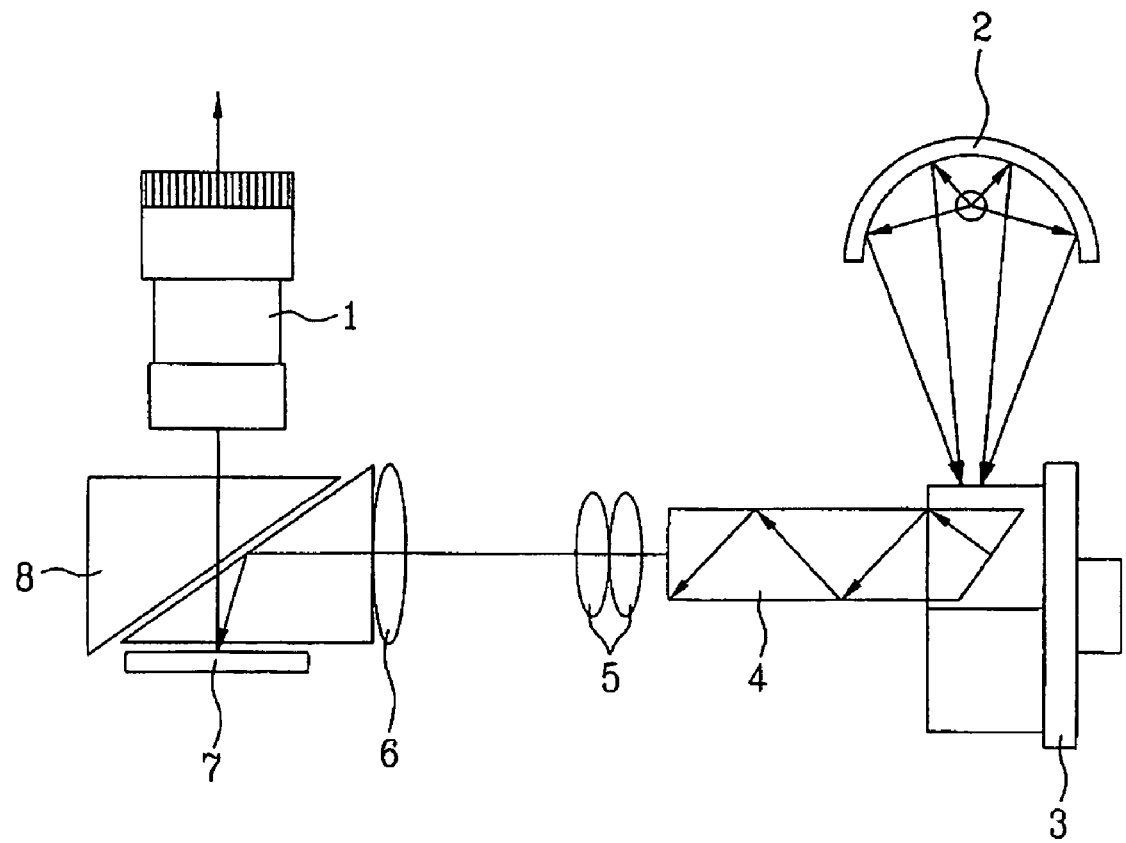
FIG. 1 is a schematic view illustrating an arrangement of a general single panel type projector.
Figure 2:
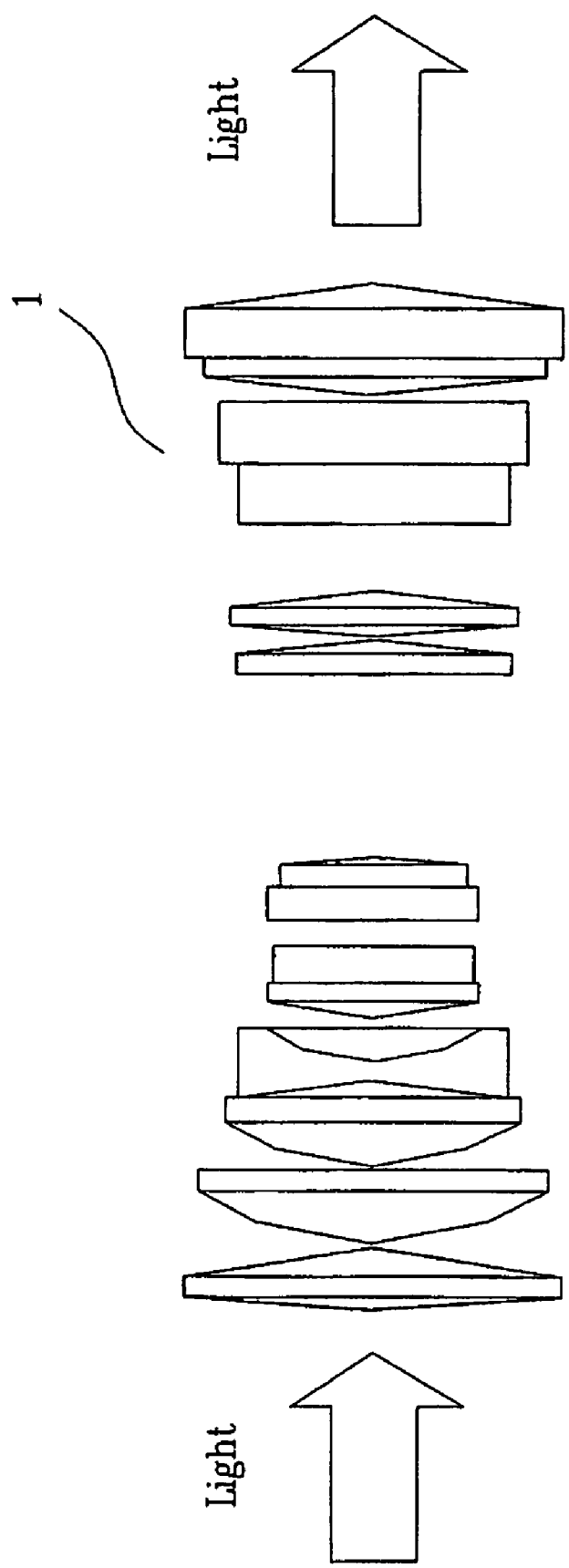
FIG. 2 is a schematic view illustrating an arrangement of a general projection lens unit.
Figure 3:
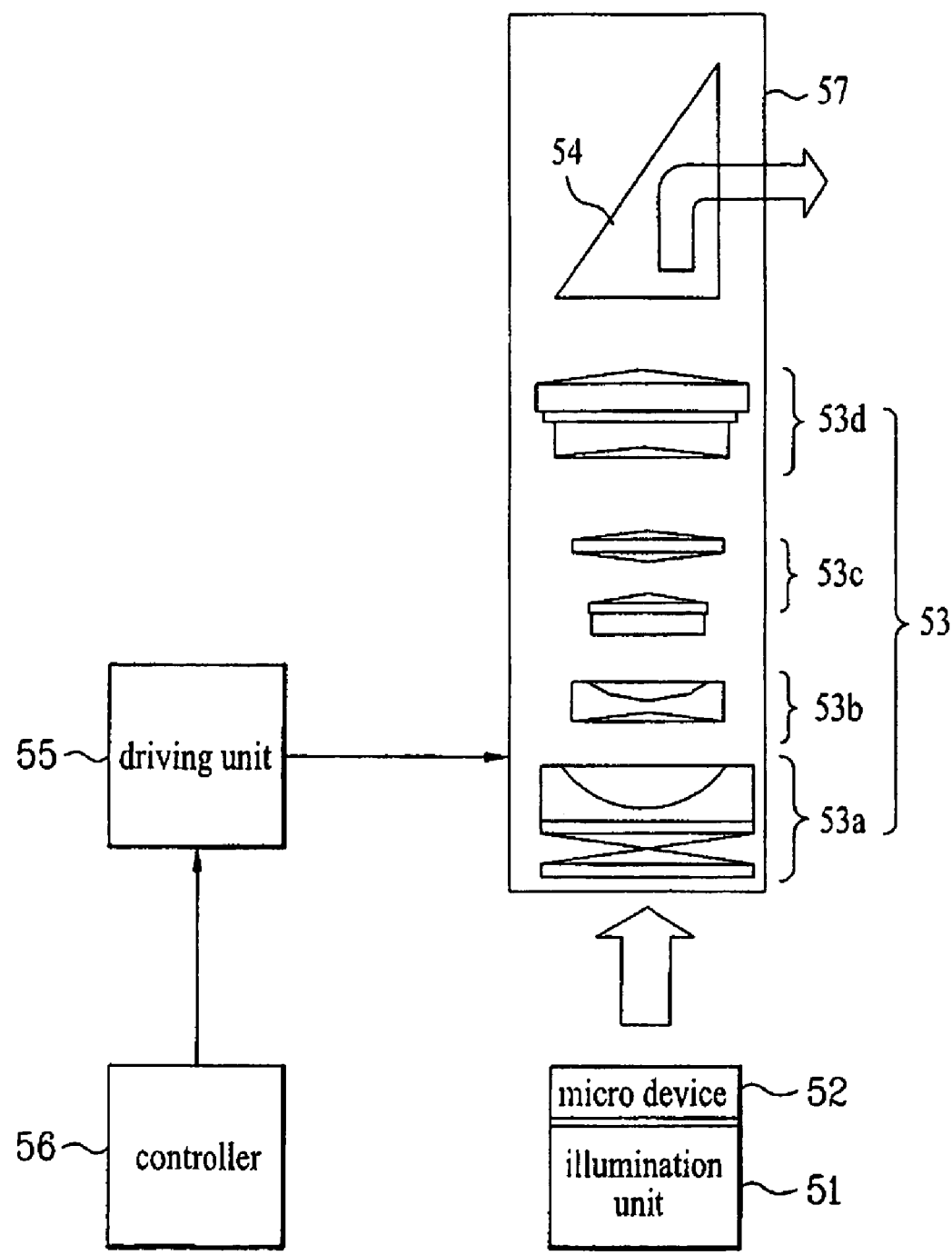
FIG. 3 is a schematic view illustrating a configuration of a projector according to a first embodiment of the present invention.
Figure 4:
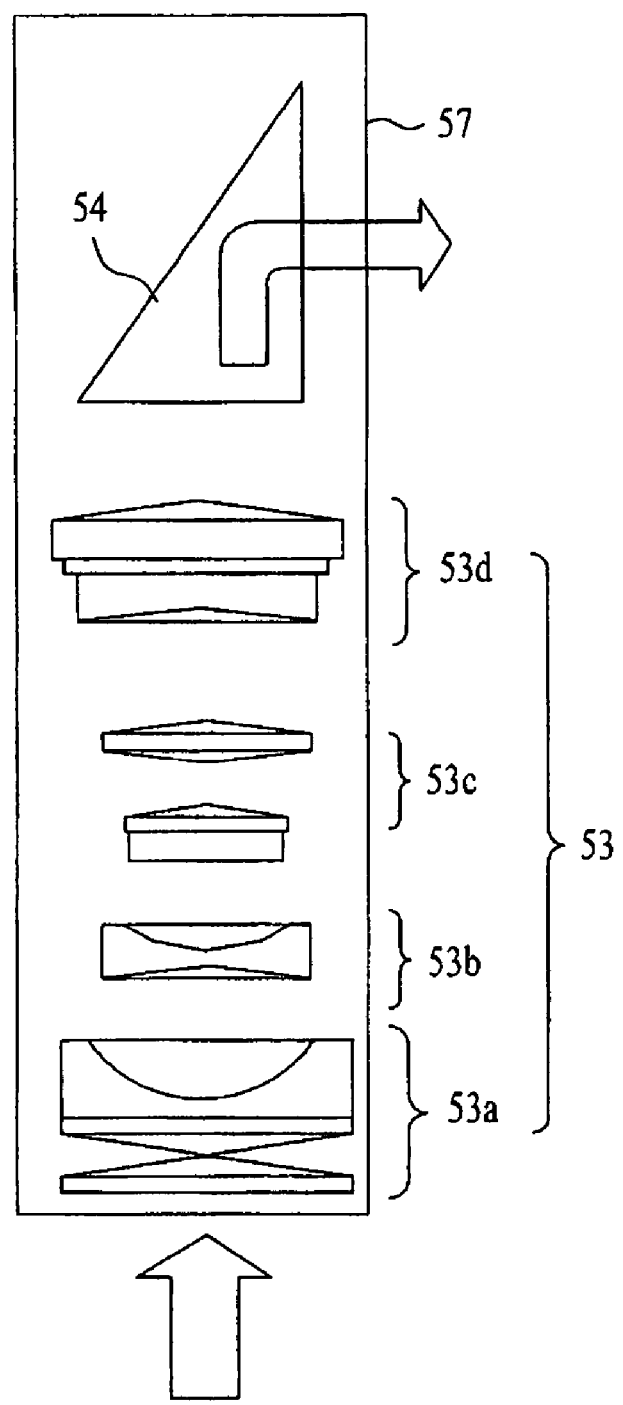
FIG. 4 is a schematic view illustrating a projection lens unit and a reflector which are shown in FIG. 3.

FIG. 3 is a schematic view illustrating a configuration of a projector according to a first embodiment of the present invention. FIG. 4 is a schematic view illustrating a projection lens unit and a reflector which are shown in FIG. 3.

As shown in FIG. 3, the projector according to the first embodiment of the present invention mainly includes an illumination unit 51, a micro device 52, a projection lens unit 53, a reflector 54, a driving unit 55, and a controller 56.

The illumination unit 51 emits light generated from a light source which may be included in the illumination unit 51.

In addition to the light source, the illumination unit 51 may include a first illumination lens set, a second illumination lens set, and a first prism.

The first illumination lens set functions to provide a uniform brightness of light emitted from the light source. The second illumination lens set functions to converge the light emitted from the first illumination lens set.

The first illumination lens set may include a light tunnel which functions to provide a uniform brightness of light, and at least one condensing lens. The second illumination lens set may include at least one condensing lens which functions to converge light.

The first prism functions to cause the light emitted from the second illumination lens set to be incident on the micro device, and to cause the light emitted from the micro device to be incident on the first lens set of the projection lens unit.

The first prism may be a total internal reflection (TIR) prism. It is preferred that the first prism be arranged over the image display face of the micro device.

The illumination unit may further include a color wheel which is arranged between the light source and the first illumination lens set, to separate the light emitted from the light source into color light components, and a mirror or a second prism which is arranged between the first illumination lens set and the second illumination lens set, to reflect the light emitted from the first illumination lens set to the second illumination lens set.

The micro device 52 receives light from the illumination unit 51, and produces an image using the received light.

The micro device 52 may be an LCD panel, an LCOS panel, or a DMD panel.

The projection lens unit 53 emits the image produced by the micro device 52.

As shown in FIG. 4, the projection lens unit 53 may include a master lens set 53a adapted to emit incident light carrying a produced image, a compensation lens set 53b adapted to compensate the light emitted from the master lens set 53a, a zoom lens set 53c adapted to adjust the focal length of light emitted from the compensation lens set 53b, and a focus adjusting lens set 53d adapted to adjust the focus of light emitted from the zoom lens set 53c.

The master lens set 53a, compensation lens set 53b, zoom lens set 53c, and focus adjusting lens set 53d are arranged in an aligned manner in parallel to the central axis of light incident on the projection lens unit 53.

The zoom lens set 53c is shiftable in a direction parallel to the central axis of the incident light, to adjust the focus of the image.

The focus adjusting lens set 53d is shiftable in a direction parallel to the central axis of the incident light, to adjust the focal length of the image.

The reflector 54 is arranged at the downstream end of the projection lens unit 53. The reflector 54 changes the direction of light incident thereon from the projection lens unit 53 such that the light is externally emitted.

The reflector 54 may include a fully-reflective mirror or a prism.

The reflector 54 has a reflection surface on which a metal such as aluminum or silver, or a dichroic material may be coated.

The driving unit 55 shifts the projection lens unit 53 and reflector 54 under control of the controller 56, so as to adjust the emission direction of the image which is externally emitted.

The driving unit 55 may be mechanically or electrically controlled.

In the projector having the above-described configuration according to the first embodiment of the present invention, the projection lens unit 53 and reflector 54 are integrated, and are received in a housing 57 such that they are simultaneously shiftable in the housing 57 by the driving unit 55.

Accordingly, the projection lens unit 53 and reflector 54 have the same shift direction and the same shift distance.

Figure 5A:
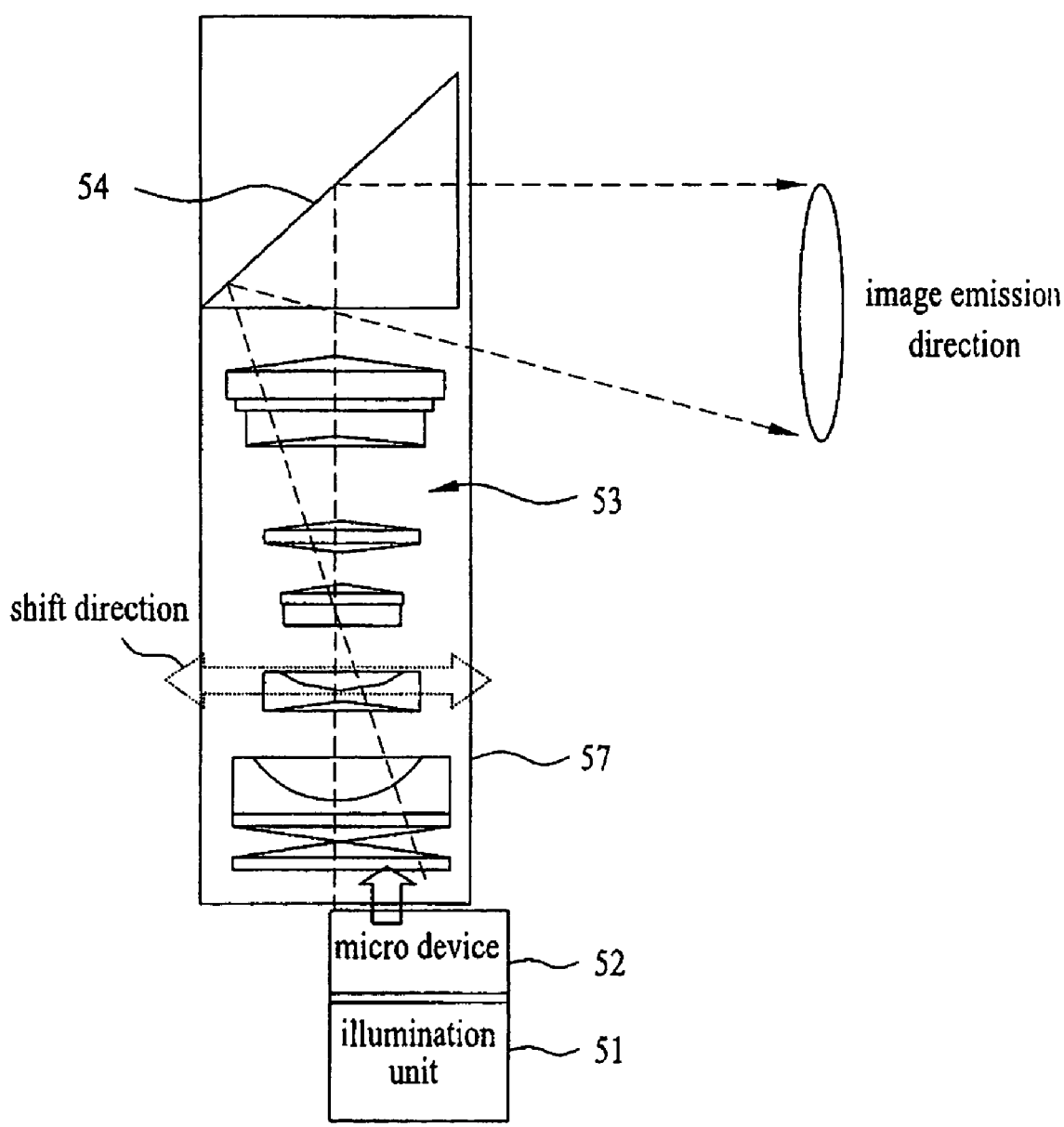
FIGS. 5A and 5B are schematic views illustrating shifts of the projection lens unit and reflector shown in FIG. 4.
Figure 5B:
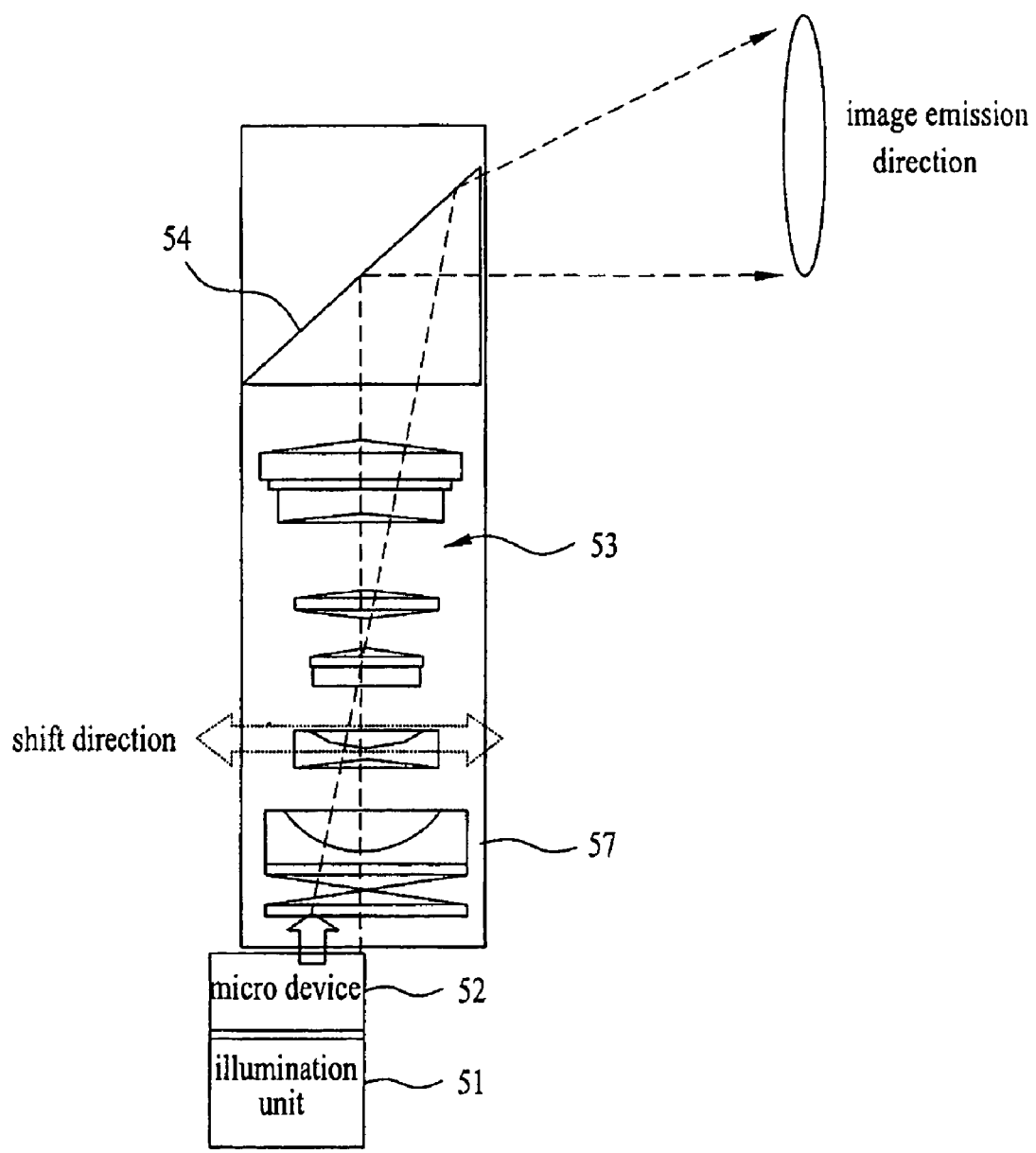

FIGS. 5A and 5B are schematic views illustrating shifts of the projection lens unit and reflector shown in FIG. 4.

As shown in FIGS. 5A and 5B, the projection lens unit 53 and reflector 54, which are integrated, are shiftable in a direction perpendicular to the optical axis of incident light by the driving unit 55 which is mechanically or electrically controlled.

When the integrated projection lens unit 53 and reflector 54 are shifted left by the driving unit 55, as shown in FIG. 5A, the emission direction of the image is shifted toward a lower side of a screen onto which the image is projected.

On the other hand, when the integrated projection lens unit 53 and reflector 54 are shifted right by the driving unit 55, as shown in FIG. 5B, the emission direction of the image is shifted toward an upper side of the screen.

Thus, in accordance with the first embodiment of the present invention, it is possible to reduce the thickness of the projector by re-arranging the illumination system and micro device of the projector, namely, by arranging the reflector 54 at the downstream end of the projection lens unit 53 such that light is emitted in a direction perpendicular to the incidence direction of the light.

Also, in accordance with the first embodiment of the present invention, it is possible to reduce the size of the reflector 54 by integrating the projection lens unit 53 and reflector 54 such that they are simultaneously shiftable. Accordingly, the overall size of the projector can be reduced.

This is because, where the reflector 54 is fixed such that only the projection lens unit 53 is shiftable, the size of the reflector 54 must be increased.

Figure 6:
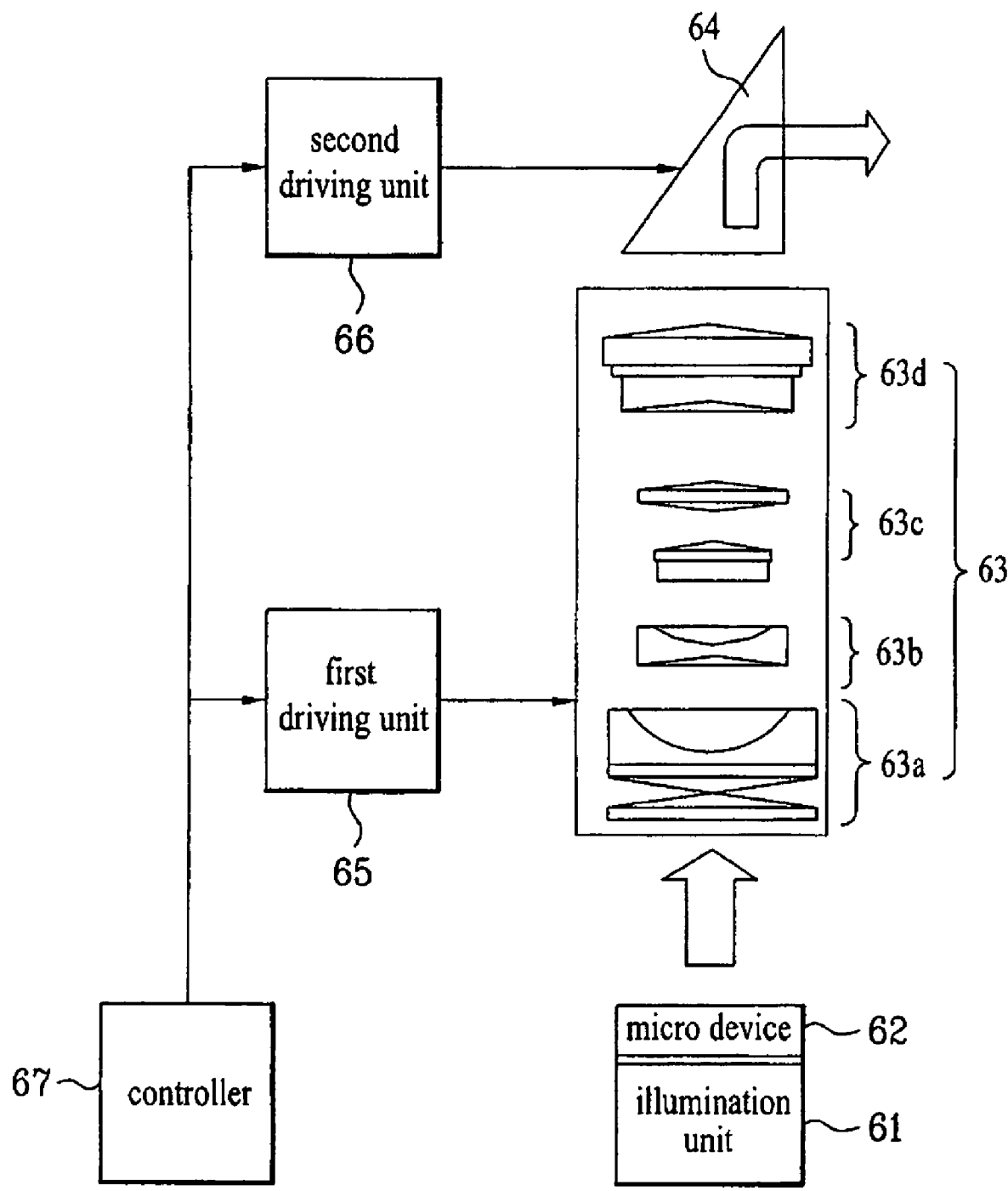
FIG. 6 is a schematic view illustrating a configuration of a projector according to a second embodiment of the present invention.
Figure 7:
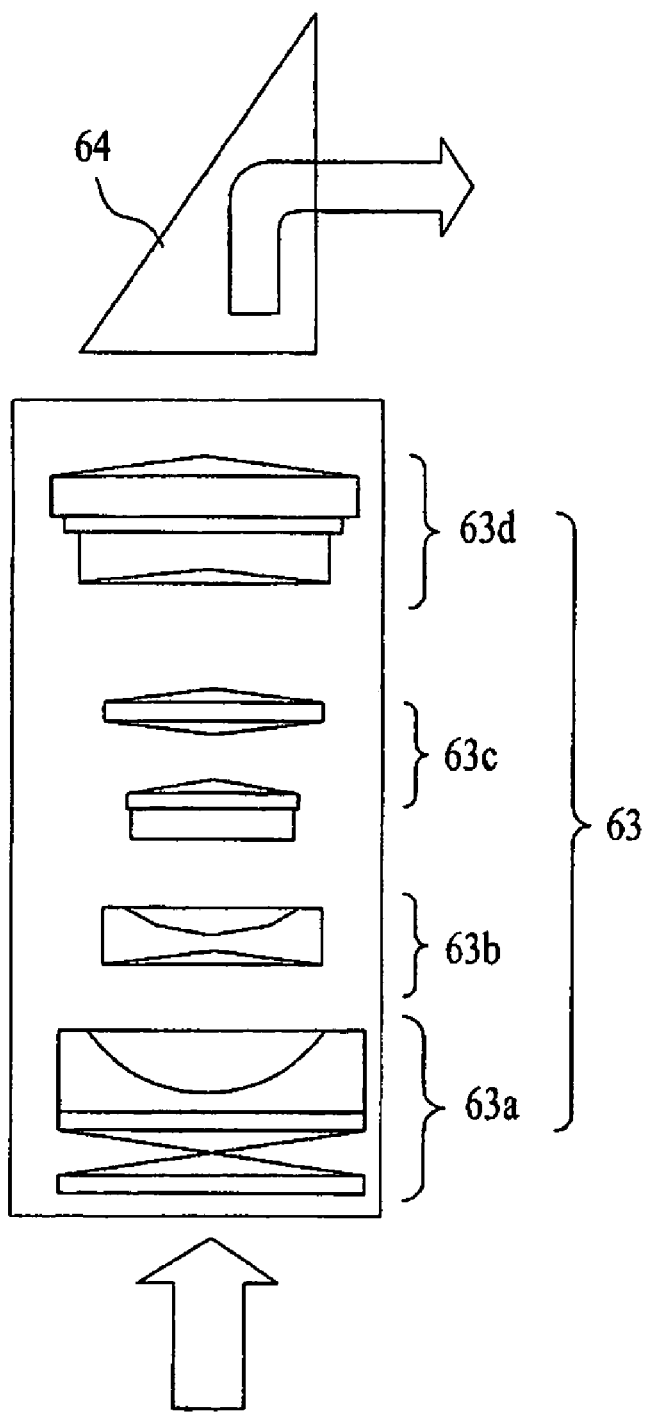
FIG. 7 is a schematic view illustrating a projection lens unit and a reflector which are shown in FIG. 6.

FIG. 6 is a schematic view illustrating a configuration of a projector according to a second embodiment of the present invention. FIG. 7 is a schematic view illustrating a projection lens unit and a reflector which are shown in FIG. 6.

As shown in FIG. 6, the projector according to the second embodiment of the present invention mainly includes an illumination unit 61, a micro device 62, a projection lens unit 63, a reflector 64, first and second driving units 65 and 66, and a controller 67.

The second embodiment of the present invention is different from the first embodiment of the present invention in that the projection lens unit 63 and the reflector 64 are separate from each other such that they are shiftable by the first and second driving units 65 and 66, respectively.

In this case, the projection lens unit 63 and the reflector 64 may have different shift directions and different shift distances, respectively.

Figure 8A:
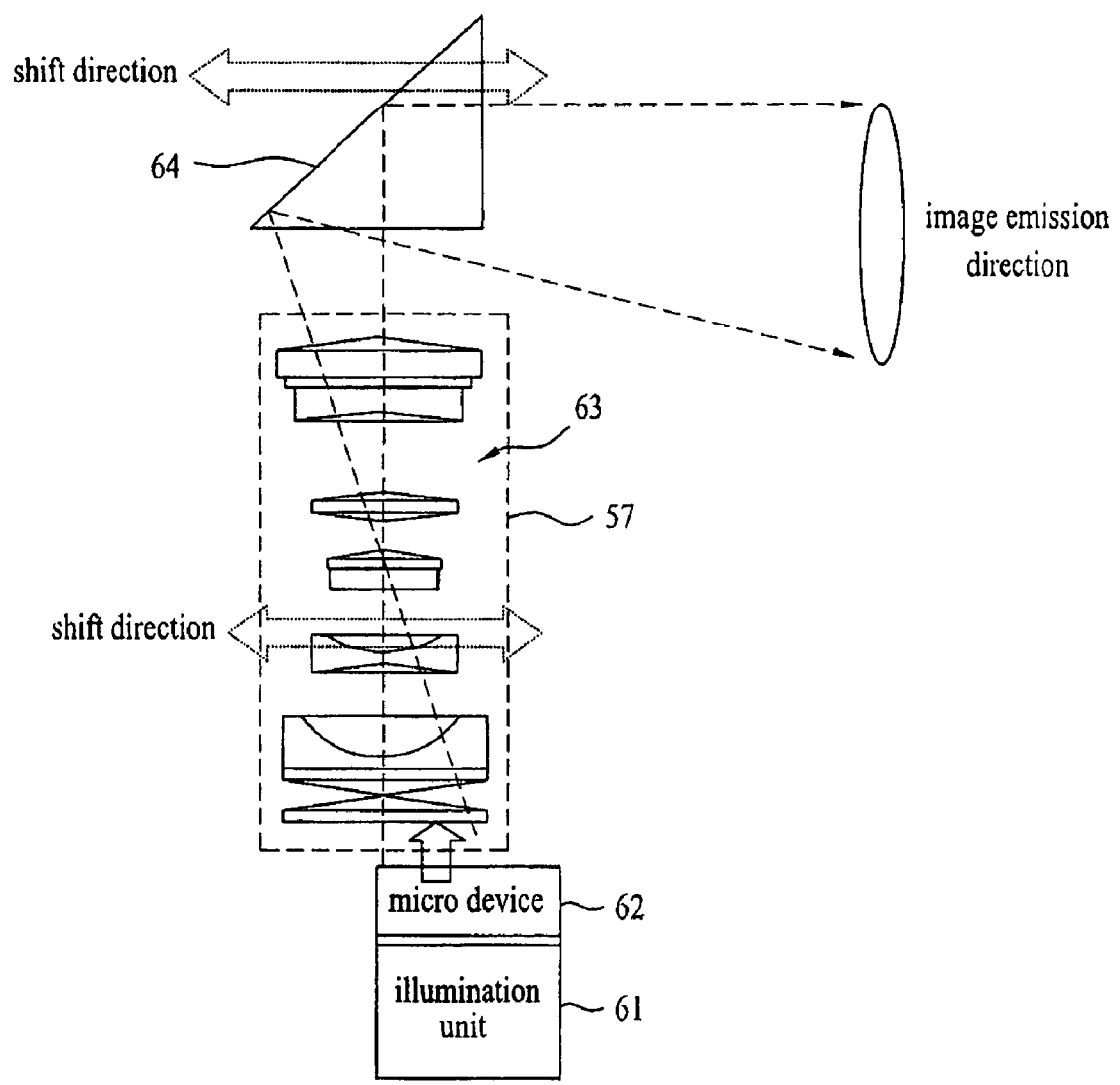
FIGS. 8A and 8B are schematic views illustrating shifts of the projection lens unit and reflector shown in FIG. 7.
Figure 8B:
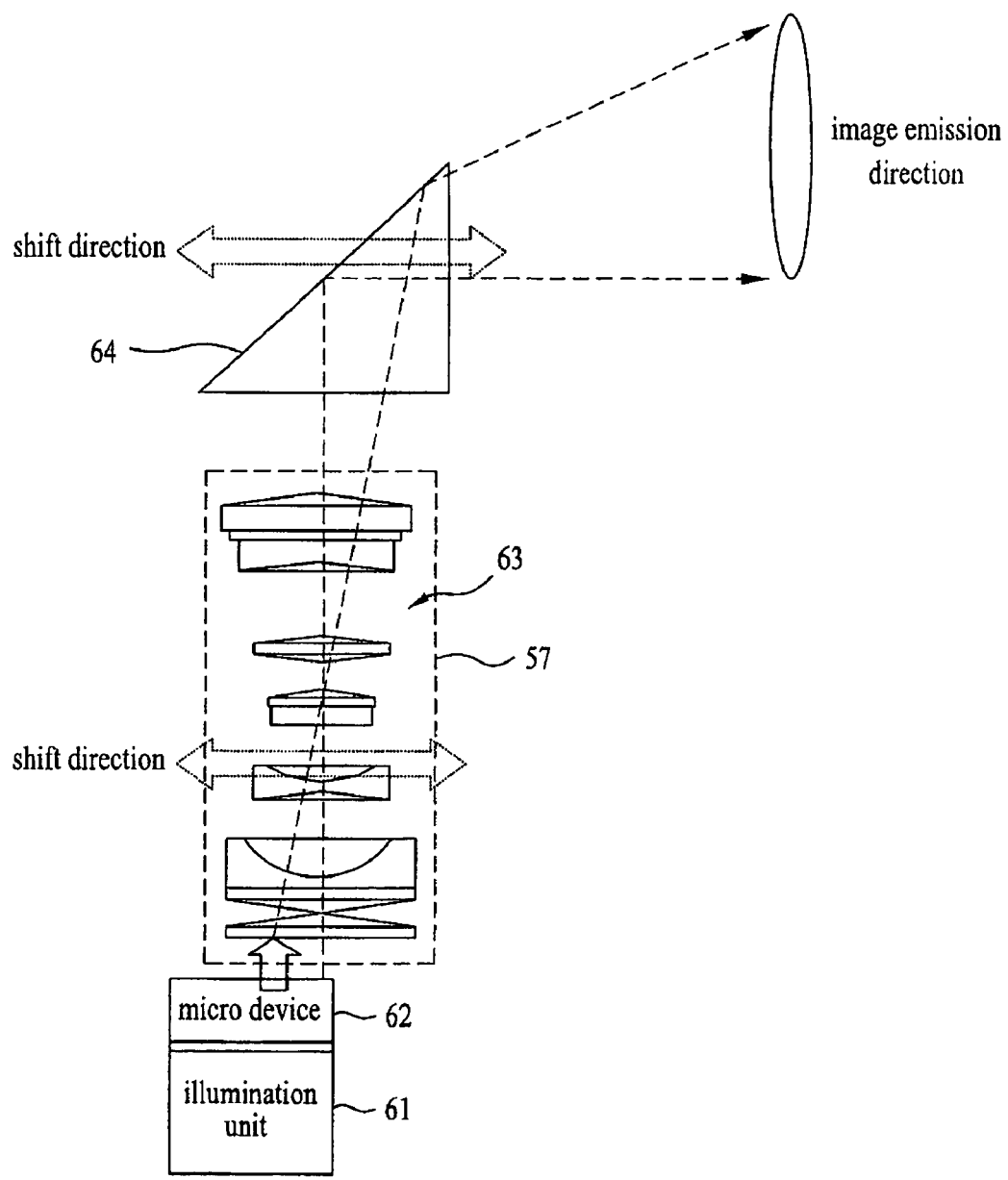

FIGS. 8A and 8B are schematic views illustrating shifts of the projection lens unit and reflector shown in FIG. 7.

As shown in FIGS. 8A and 8B, the projection lens unit 63 and reflector 64, which are separate from each other, are shiftable in a direction perpendicular to the optical axis of incident light by the first and second driving units 65 and 66 which are mechanically or electrically controlled, respectively.

Since the projection lens unit 63 and the reflector 64 are shifted in an independent manner, it is possible to finely adjust the image emission direction of the projector. It is also possible to further reduce the size of the reflector 65.

As apparent from the above description, the present invention provides a projector which includes an optical system having an arrangement capable of reducing the thickness of the projector, so that the projector can be conveniently installed in a minimal installation space.

In accordance with the present invention, it is also possible to adjust the image emission direction of the projector because the projection lens unit and reflector of the projector are shiftable.

In addition, since thinness of the projector can be achieved in accordance with the present invention, it is possible to conveniently install the projector in diverse places.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projector comprising:
   an illumination unit adapted to emit generated light;
   a micro device adapted to receive the light from the illumination unit, and to produce an image using the received light;
   a projection lens unit adapted to emit the image produced by the micro device;
   a reflector arranged at a downstream end of the projection lens unit, and adapted to change a direction of the light incident from the projection lens unit on the reflector such that the image is externally emitted; and
   a driving unit adapted to shift the projection lens unit and the reflector, thereby adjusting an emission direction of the externally-emitted image.

2. The projector according to claim 1, wherein the micro device is a liquid crystal display (LCD) panel, a liquid crystal on silicon (LCOS) panel, or a digital micromirror device (DMD) panel.

3. The projector according to claim 1, wherein the projection lens unit includes:
   a master lens set adapted to emit light carrying the produced image;
   a compensation lens set adapted to compensate light emitted from the master lens set;
   a zoom lens set adapted to adjust a focal length of light emitted from the compensation lens set; and
   a focus adjusting lens set adapted to adjust a focus of light emitted from the zoom lens set.

4. The projector according to claim 3, wherein the master lens set, the compensation lens set, the zoom lens set, and the focus adjusting lens set are arranged in an aligned manner in parallel to a central axis of light incident on the projection lens unit.

5. The projector according to claim 3, wherein the zoom lens set is shiftable in a direction parallel to the central axis of the incident light, to adjust the focus of the image.

6. The projector according to claim 3, wherein the focus adjusting lens set is shiftable in a direction parallel to the central axis of the incident light, to adjust the focal length of the image.

7. The projector according to claim 1, wherein the reflector includes a fully-reflective mirror or a prism.

8. The projector according to claim 1, wherein the projection lens unit and the reflector are integrated such that the projection lens unit and the reflector are simultaneously shiftable by the driving unit.

9. The projector according to claim 8, wherein the projection lens unit and the reflector have the same shift direction and the same shift distance.

10. The projector according to claim 1, wherein the projection lens unit and the reflector are separate from each other such that the projection lens unit and the reflector are independently shiftable by the driving unit.

11. The projector according to claim 10, wherein the projection lens unit and the reflector have different shift directions and different shift distances, respectively.

12. The projector according to claim 1, wherein the projection lens unit and the reflector are shiftable in a direction perpendicular to a central axis of light incident on the projection lens unit.

13. The projector according to claim 1, wherein the driving unit is mechanically or electrically controlled.

14. The projector according to claim 1, further comprising:
a controller adapted to control the driving unit.

15. A projector comprising:
an illumination unit adapted to emit generated light;
a micro device adapted to receive the light from the illumination unit, and to produce an image using the received light;
a projection lens unit adapted to emit the image produced by the micro device;
a reflector arranged at a downstream end of the projection lens unit, and integrated with the projection lens unit, the reflector being adapted to change a direction of the light incident from the projection lens unit on the reflector such that the image is externally emitted; and
a driving unit adapted to simultaneously shift the projection lens unit and the reflector, thereby adjusting an emission direction of the externally-emitted image.

16. The projector according to claim 14, wherein the projection lens unit and the reflector have the same shift direction and the same shift distance.

17. The projector according to claim 14, wherein the projection lens unit and the reflector are shiftable in a direction perpendicular to a central axis of light incident on the projection lens unit.

18. A projector comprising:
an illumination unit adapted to emit generated light;
a micro device adapted to receive the light from the illumination unit, and to produce an image using the received light;
a projection lens unit adapted to emit the image produced by the micro device;
a reflector arranged at a downstream end of the projection lens unit, and adapted to change a direction of the light incident from the projection lens unit on the reflector such that the image is externally emitted;
a first driving unit adapted to shift the projection lens unit in a predetermined direction;
a second driving unit adapted to shift the reflector in a predetermined direction; and
a controller adapted to control the first and second driving units.

19. The projector according to claim 18, wherein the projection lens unit and the reflector have different shift directions and different shift distances, respectively.

20. The projector according to claim 18, wherein the projection lens unit and the reflector are shiftable in a direction perpendicular to a central axis of light incident on the projection lens unit.

21. The projector according to claim 1, wherein the reflector and the projection lens unit are arranged in a straight line to a central axis of light incident emitted from the micro device, and the reflector is located between the projection lens unit and a screen and emits the light incident to the screen.

22. The projector according to claim 15, wherein the reflector and the projection lens unit are arranged in a straight line to a central axis of light incident emitted from the micro device, and the reflector is located between the projection lens unit and a screen and emits the light incident to the screen.

23. The projector according to claim 18, wherein the reflector and the projection lens unit are arranged in a straight line to a central axis of light incident emitted from the micro device, and the reflector is located between the projection lens unit and a screen and emits the light incident to the screen.

* * * * *